United States Patent [15] 3,679,003
Wadsworth [45] July 25, 1972

[54] LAWN EDGE TRIMMING MACHINE

[72] Inventor: Donald E. Wadsworth, 88 N. W. 165th St., Miami, Fla. 33169

[22] Filed: June 17, 1970

[21] Appl. No.: 46,956

[52] U.S. Cl..................................172/15, 172/17, 172/43, 172/384, 56/256
[51] Int. Cl. ...........................................A01b 45/00
[58] Field of Search................................172/13–18; 56/256

[56] References Cited

UNITED STATES PATENTS

| | | | |
|---|---|---|---|
| 2,478,813 | 8/1949 | Esleck | 172/15 |
| 3,472,007 | 10/1969 | Green | 56/256 |
| 3,533,223 | 10/1970 | Gunn et al. | 172/15 |
| 3,171,497 | 3/1965 | Haigh | 172/15 |
| 2,719,400 | 10/1955 | Lesesne | 56/256 |
| 3,079,743 | 3/1963 | Egley | 172/15 |
| 2,538,230 | 1/1951 | Boggs | 172/16 |
| 2,847,813 | 8/1958 | Hanson | 172/15 |
| 3,057,411 | 10/1962 | Carlton | 172/15 |
| 3,168,147 | 2/1965 | Peters | 172/15 |
| 3,441,089 | 4/1969 | Minton | 172/14 |

Primary Examiner—Robert E. Pulfrey
Assistant Examiner—C. W. Hanor
Attorney—Ernest H. Schmidt

[57] ABSTRACT

A lawn edge trimming machine or edger is described wherein cutter blade height is controlled by relative angular adjustment of an opposed pair of handle grip members used by the operator in propelling the machine. The cutter adjustment mechanism includes coaxial pivotal means surrounding the take-off shaft and carrying a rocker arm rotatively supporting the cutter blade for belt connection with the drive shaft, the arrangement being such that the rotative axis of the cutter blade is in the vicinity of that of the ground wheel at the same side of the machine, for simplicity and compactness of structure, for improved performance, and for enhanced maneuverability. A protective cover guard surrounding the cutter blade assembly provides maximum protection against flying objects propelled by the cutter blade, while at the same time, being comprised partly of wire mesh screening, affording a view of the rotating cutter blade to the operator during use of the machine. Foot-pedal controlled means is provided for converting the machine between vertical and oblique planes of operation of the cutter blade, for correspondingly different modes of cutter operation.

11 Claims, 8 Drawing Figures

Patented July 25, 1972
3,679,003
3 Sheets-Sheet 1
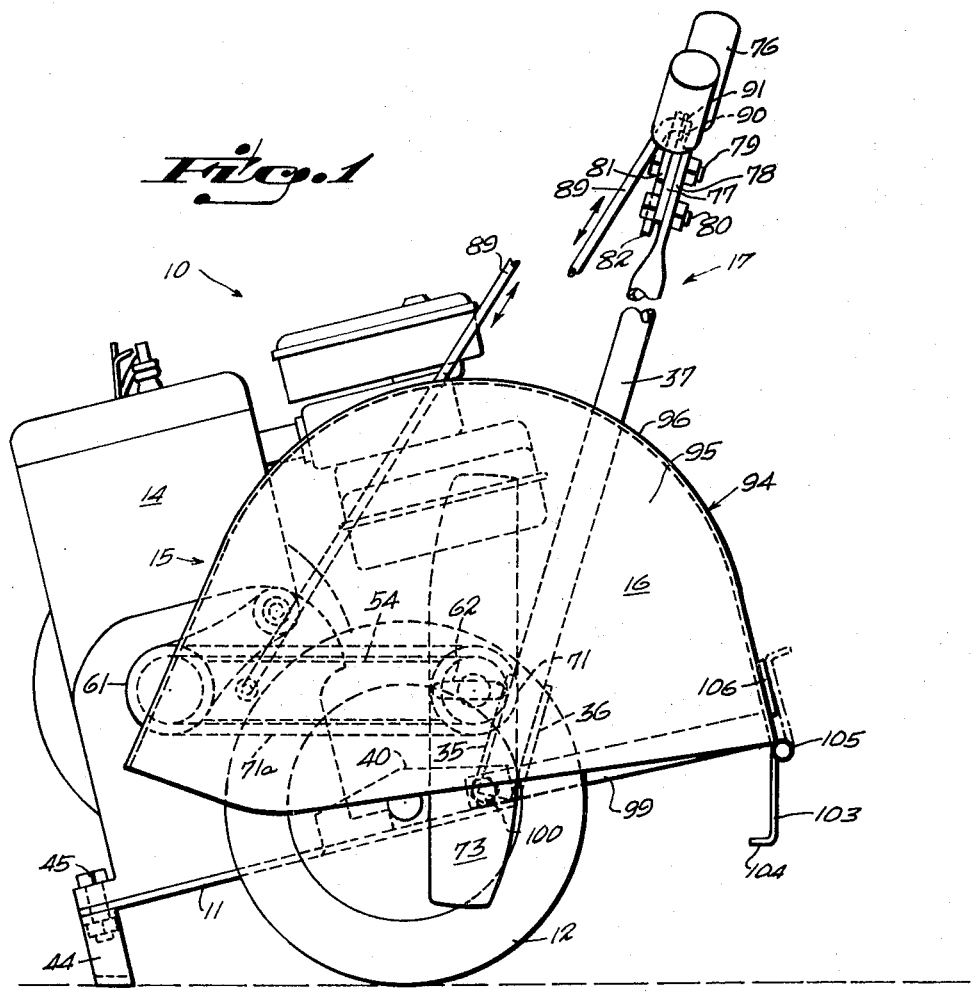
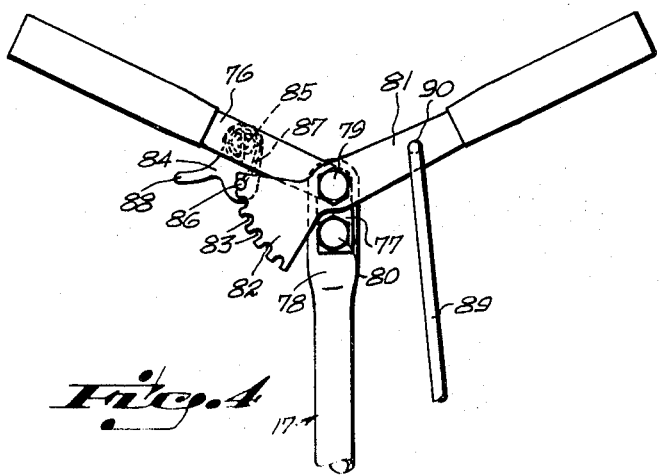
INVENTOR.
DONALD E. WADSWORTH
BY
Ernest H Schmidt
ATTORNEY.

Patented July 25, 1972

INVENTOR.
DONALD E. WADSWORTH
BY
Ernest H. Schmidt
ATTORNEY.

INVENTOR.
DONALD E. WADSWORTH
BY
Ernest H. Schmidt
ATTORNEY

LAWN EDGE TRIMMING MACHINE

This invention relates to lawn edge trimming machines or lawn trimmers and is directed particularly to improvements in such machines resulting in greater safety off operation while at the same time improving efficiency, control and operation thereof in the performance of lawn trimming operations.

It is well known that lawn edge trimming machines of the type utilizing a swiftly rotating blade as the cutting element are potentially dangerous because of the blade's inadequate protective covering against personal contact injury and tendency to strike pebbles, rock fragments, foreign objects such as pieces or wire and the like, and propel them outwardly of the machine at high velocities in almost any direction. Various protective cover plates or guards for the rotating cutter blade of lawn edgers have heretofore been devised in an attempt to minimize the possibility of injury either to the machine operator or to bystanders during operation of the machine. Such protective devices as have heretofore been devised, however, have been deficient in one or more respects, principally in that if they were sufficiently enclosing to prevent escape of propelled objects and prevent blade contact personal injury, they either obstructed the operator's view of the cutter blade to such an extent that it became difficult for him to accurately perform cutting or edging operations, or interfered with the maneuverability of the machine.

It is, accordingly, the principal object of this invention to provide a new and improved lawn edge trimming machine or edger of the type utilizing a rotating cutter blade, and which will be unusually safe in operation while at the same time being readily controllable and maneuverable for ease and accuracy in the performance of edging operations.

A more particular object of the invention is to provide a lawn trimming machine of the above nature including a platform supported by axle means having two ground wheels thereon and a prime mover mounted on the platform, wherein the trimming machine with prime mover is supported in a load-free, substantially balanced manner, with a mechanism thereon being arranged to permit close-up easy sighting of the trimming course to be followed and providing true, non-deflecting, smooth and even cutter blade performance, wherein the trimming machine may be easily and safely regulated, controlled and propelled by control means at the side of the operator, and wherein trimming operations along curves and circles may be conducted without the necessity of working the machine back and forth.

Yet another object of the invention is to provide a lawn edge trimming machine of the character described incorporating, in spaced relation surrounding the power take-off shaft of the prime mover, coacting tubular pivotal means, a pivotal member of which is connected to a rocker arm the outer end of which carries, rotatively journalled with respect thereto, a cutter blade and pulley assembly belt-connected to the drive shaft for simplicity, economy and dependability of operation while at the same time being particularly well suited to the use in association therewith of a simplified and improved protective cover guard.

Still another object of the invention is to provide a lawn edge trimming machine of the above nature wherein the protective cover guard is placed in enclosing relation directly over the rotative cutting blade or knife for effective protection against blade contact personal injury and outward escape of blade-propelled objects for maximum protection of the machine operator and bystanders during use of the machine, and wherein a portion of the cover guard is in the form of a wire mesh screen permitting visual observance of the action of the cutter blade by the operator during edging operations.

Yet another object of the invention is to provide, as part of the protective cover guard, a hinged flat guard attached to the bottom rear of the main guard structure for further protection against low flying, rearwardly-propelled objects.

Still another object of the invention is to provide a lawn edge trimming machine of the above nature including novel and improved trimming blade elevational and positional locking means controlled by a relative movement of the operating grip handles, whereby edge trimming operation elevations may be quickly and easily regulated by the machine operator for either free up and down movement or positioned and locked in place without performance interruption or the operator being required to remove either of his hands from the machine grip handles.

A still further object of the invention is to provide a lawn trimming machine of the above nature including means controlled by a conveniently placed latch-releasing operator's foot pedal for angularly displacing a pivotally attached supporting wheel axle of the machine, thereby causing the machine to be tilted sidewards for conversion from a conventional vertical type edging position to a special oblique angular type trimming position for handy trench making and the trimming of hard-to-get-at growth next to walls, fences, hedges, etc. By manually tilting the machine back again until the latch drops back into place, the original vertical type edging service position is restored. Change from the conventional vertical type edging position to the oblique angular type trimming service position is thus effected by the operator while standing in his ordinary operating position and without any necessity for making manual adjustments in the vicinity of the rotating cutting blade or knife.

Other objects, features and advantages of the invention will be apparent from the following description when read with reference to the accompanying drawings. In the drawings, wherein like reference numerals denote corresponding parts throughout the several views:

FIG. 1 is a side elevational view with portions broken away of a preferred form of lawn edge trimming machine embodying the invention.

FIG. 4 is a front elevational view of the upper portion of machine handle grip assembly illustrating details of the mechanism controlling the elevation and positional adjustment of the cutter blade;

Figure 6:
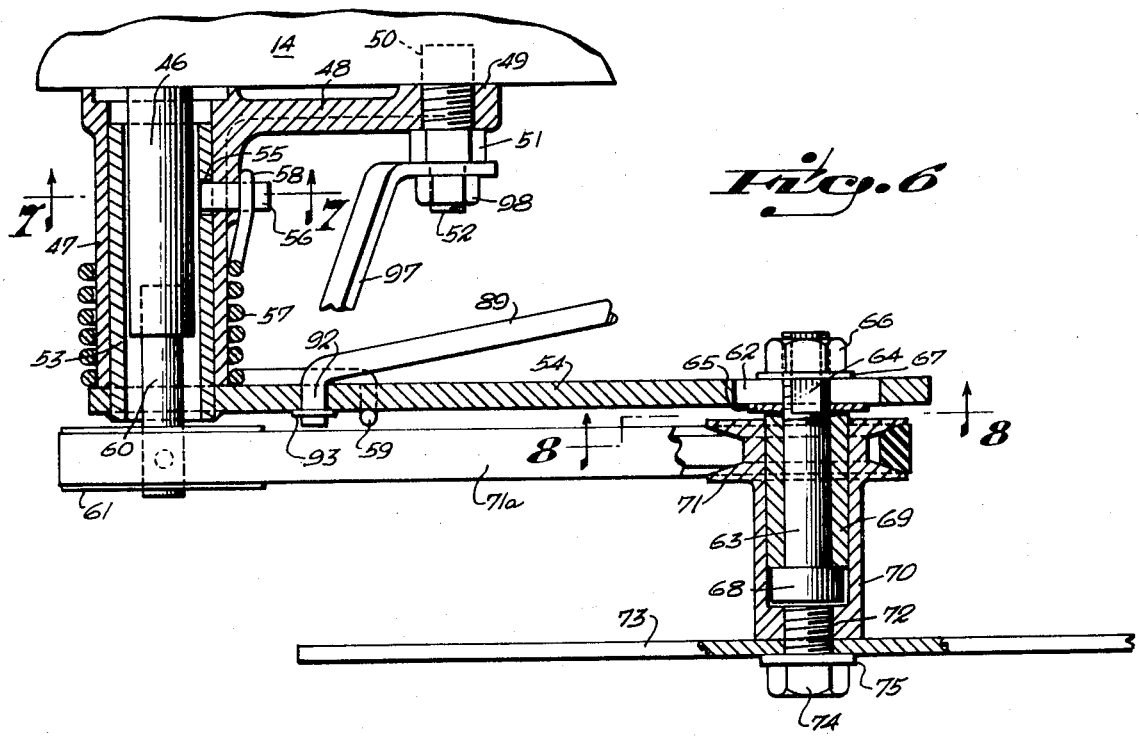
FIG. 6 is a fragmentary view, on an enlarged scale and partly in longitudinal cross-section, of the rocker arm and cutter blade assembly.
Figure 7:
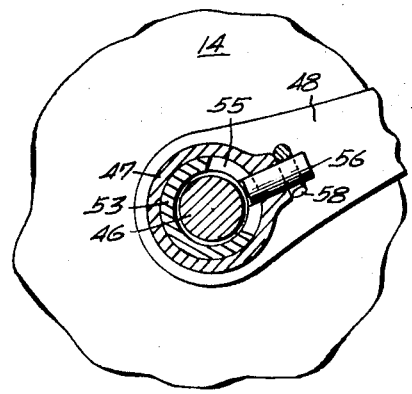
Figure 8:
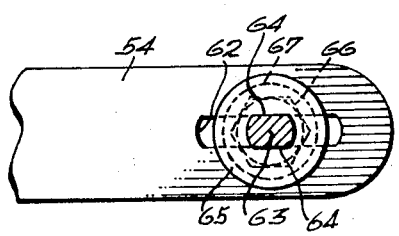

FIG. 7 is a transverse cross-sectional view taken along the line 7—7 of FIG. 6 in the direction of the arrows and illustrating mechanical details of the limit position mechanism for the rocker arm; and FIG. 8 is a transverse cross-sectional view, taken along the line 8—8 of FIG. 6 in the direction of the arrows, and illustrating the mechanism by means of which the cutter blade pulley assembly is adjustable secured at the outer end of the rocker arm.

Referring now in detail to the drawings, 10 designates, generally, a lawn edge trimming machine embodying the invention, the same being comprised of a machine platform 11 supported by a pair of inner and outer wheels 12, 13, respectively, and carrying a cutter drive engine or prime mover 14, preferably a gasoline operated internal combustion engine. The engine 14 is drivingly interconnected with a cutter assembly 15, the rotary cutter blade of which is partially enclosed by a protective cover guard assembly 16, as is hereinbelow more particularly described. A handle assembly 17 is provided for pushing the machine.

Figures 2, 3, 5:
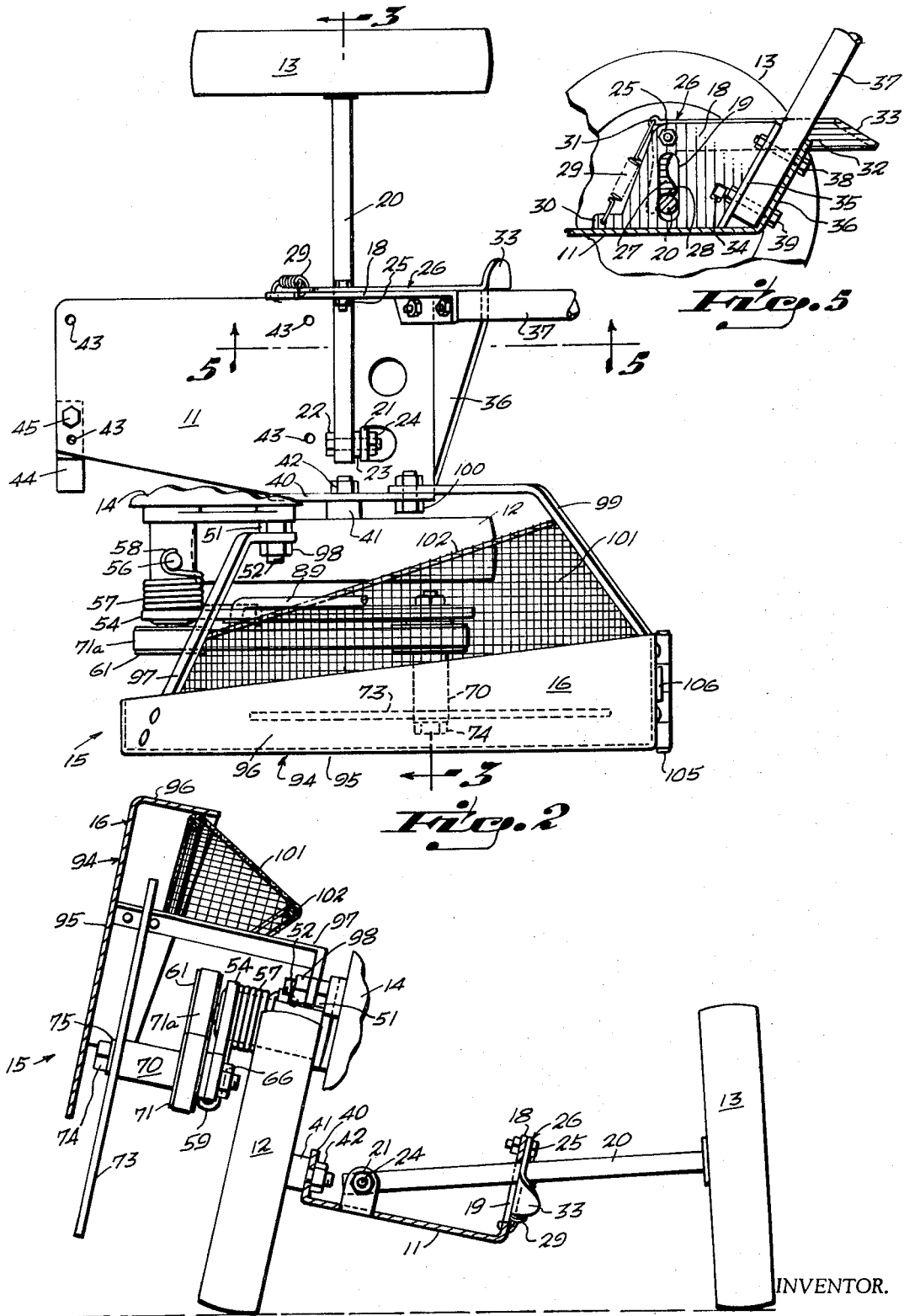
FIG. 2 is a top view, with portions broken away to reveal constructional details, of the lawn edge trimming machine.
FIG. 3 is a transverse cross-sectional view, taken along the broken line 3—3 of FIG. 2 in the direction of the arrows, and further showing the machine in its oblique converted position of operation.
FIG. 5 is a longitudinal cross-sectional view, taken along the line 5—5 of FIG. 2 in the direction of the arrows, and illustrating mechanical details of the pedal-controlled latch mechanism enabling conversion of the machine between vertical type edging service position and oblique service position, the mechanism being shown in FIGS. 2 and 5 in the vertical service edging position.

The machine platform 11, which is preferably integrally formed of bent steel plate, is generally of rectangular shape and has at one side, the right hand side as seen in FIG. 2 and 5, an upturned axle support portion in the general shape of a right angle upright, indicated at 18, the forward portion of which is provided with a vertically-extending slot 19. An axle 20 journalling the outer wheel 13 at its outer end, extends through the vertically-extending slot 19 to be pivotally attached at its inner end to an axle pivot bracket 21 struck upwardly from the machine platform 11 by a forwardly-extending bolt 22 carrying an intermediate washer 23 and secured by nut 24. Means is provided for retaining the axle 20 at its lowermost position within the vertically-extending slot 19, as illustrated in FIGS. 2 and 5, whereat the machine platform 11 will be supported in substantially horizontal disposition above the ground so that the cutter will operate substantially perpendicular to the ground or, selectively, to permit the said axle to pivot or swing upwardly to the upper limit position in said slot, as is illustrated in FIG. 3, so that the cutter blade will strike the ground or grass to be cut obliquely. To this end the upstanding axle support portion 18 of the machine platform 11 has pivotally attached thereto at an upper front portion thereof, as by bolt 25,(see FIG. 5),a bell crank lever 26. The bell crank lever 26 has a downwardly-extending lever arm portion 27 the outer end of which is arcuately recessed; towards the rear of the machine, to provide an upper abutment surface or shoulder 28. A helical tension spring 29 having one end attached with an opening in a forwardly-extending lug portion 30 of the axle support portion 18, and the other end attached in an opening formed in outwardly-extending ear portion 31 at the upper end of the downwardly-extending lever arm portion 27, serves to resiliently constrain the bell crank lever 26 in a counter clock-wise direction as viewed in FIG. 5. The tension spring 29 thus serves to retain the bell crank lever 26 in locking engagement with the axle 20 when its downward-most or level position within the vertically extending slot 19. The bell crank lever 26 also comprises a rearwardly-extending lever arm portion 32 terminating in an angularly outwardly-extending pedal portion 33 adapted to be depressed by the foot of machine operator for release of the axle 20 from its above-described retained lower position so that it will assume the uppermost position within the slot 19, as illustrated in FIG. 3, for obliquely tilting the platform supported mechanism including the rotary cutter, as described above. Upon manually tilting the machine to the previous upright position the lever springs back into locking engagement, securing machine in upright position again. As further illustrated in FIG. 5 the axle support portion 18 of the machine platform 11 is also provided with a small, outstruck lug 34, in spaced relation beneath the lower edge of the rearwardly-extending lever arm portion 33 of the bell crank lever 26, which serves as an abutment stop limiting downward movement of said rearwardly-extending lever arm portion when actuated as described above releasing the axle 20 to assume its uppermost position.

The upturned axle support portion 18 of the machine platform 11 has a marginal rear end portion thereof inwardly bent to provide an upwardly and rearwardly-inclined handle support bracket 35. The rear end of the machine platform 11 is formed with an upwardly bent rear portion 36 in spaced parallel relation with respect to inwardly-bent portion 35 to define therebetween a slot receiving the lower end of an intermediate tubular handle 37 secured in clamped relation as by bolts 38, 39.

The machine platform 11, at the left hand side thereof opposite the above described axle support portion 18, is provided with an upwardly-bent wheel support bracket portion 40 (see FIGS. 1, 2, and 3) supporting the axle 41 on which the inner wheel 12 is journalled as by attachment nut 42.

As illustrated in FIG. 2 the horizontal portion of the machine platform 11 is provided with four engine mounting holes 43 for the reception of bolts for securing the engine 14 to said platform (engine not illustrated in FIGS. 2 and 3 for clarity of illustration). As is best illustrated in FIGS. 1 and 2 a short, bent strap metal prop leg 44 is secured against an underside front portion of the machine platform 11 as by bolt 45, which serves to support the trimming machine in slightly forwardly-tilted rest position when not in use (see FIG. 1).

As illustrated in FIGS. 6 and 7 the engine drive shaft 46, which extends sidewardly outwardly of the machine platform 11 in the direction of the inner wheel 12, being disposed somewhat forwardly and upwardly of said wheel, has circumjacently arranged in spaced relation with respect thereto a pivot support tube 47. The pivot support tube 47 is integrally formed with a securing arm portion 48 at its inner end, the outer end 49 of which is provided with a through opening for the reception of stud bolt 51 threaded in a tapped opening boss 50 in the motor block for maintaining the pivot support tube 47 in place. The stud bolt 51 is integrally formed with an outwardly-extending, reduced-diameter threaded stud portion 52 for the purpose hereinafter appearing. Rotatably journalled within the pivot tube 47 is a cylindrical pivot sleeve 53 the outer end of which extends beyond the outer end of said pivot tube whereat it is attached, as by welding, to a rearwardly-extending rocker arm 54.

With reference to FIGS. 6 and 7 it is to be particularly noted that the rocker arm pivot sleeve 53 is rotatively pivoted with respect to the fixed pivot tube 47, their interfitting bearing surfaces extending substantially to the full distance along their lengths; and that the inner diameter of said pivot sleeve 53 is slightly greater than the outer diameter of the coaxial engine drive shaft 46.

Means is provided for limiting the relative rotative movement of the pivot sleeve 53 within the pivot support tube 47 so that the rocker arm 54 coactive with said pivot sleeve will be constrained between upper and lower cutter positions, as is hereinbelow more particularly described. To this end, as best illustrated in FIGS. 6 and 7, the pivot sleeve 53 is provided near its inner end with a peripherally-extending arcuate slot 55, and the pivot tube 47 is provided with a radial opening in register with said arcuate slot within which is frictionally retained a split-pin spring tube 56 extending into said slot, yet being short of the motor drive shaft 46. It will be understood that upper and lower limit positions of the rocker arm 54 will be determined by the inner end of the pin 56 striking the respective ends of the arcuate slot 55.

Means is provided for resiliently urging the rocker arm 54 to its uppermost limit position whereat the limit pin 56 will be in abutment with the lower end of the arcuate pivot tube slot 55. To this end a helical torsion spring 57 is circumjacently disposed about the pivot support tube 47 between the abutment pin 56 and the rocker arm 54, one end of said spring being hookingly anchored about an outwardly-projecting end of the abutment pin 56, as indicated at 58, and the other end of said spring being hookingly engaged under an inner portion of rocker arm 54, as indicated at 59 in FIGS. 3 and 6. It is to be understood that the torsion spring 57 is so wound, and so torsionally prestressed, as to urge the rocker arm 54 in its upwardmost limit position, being the anti-clockwise-most elevated position as illustrated in FIG. 1, whereat the cutter blade rotative axis will be in its relative upwardmost and non-cutting position.

As best illustrated in FIG. 6, the engine drive shaft 46 is axially drilled and threaded at its outer end to threadingly receive securely fitted therein the inner end of a pulley shaft 60 of somehat decreased diameter. The pulley shaft 60 extends somewhat outwardly beyond the pivot sleeve 53 and carries, appropriately fixed at the outer end thereof, a belt drive pulley 61. The outer end of the rocker arm 54 is provided with an axial slot 62 (see also FIG. 8) for the reception therethrough of the threaded end portion of a bearing shaft bolt 63, said bearing bolt end portion being formed with opposed flats 64 constraining said shaft bolt to lengthwise adjustment in the axial slot 62. A washer 65 having a similar flattened side opening is fitted against the inner end of said bearing bolt end portion to provide for increased bearing surface against the inside of the rocker arm 54. The outer threaded end of the bearing shaft bolt 63 is adjustably retained in place by a nut 66 and lock washer 67.

The bearing shaft bolt 63 is formed with a cylindrical head 68 retaining from underneath a bearing bushing 69 slidingly fitted on said bearing shaft bolt. A pulley sleeve 70 is fitted in embracing relation about the bearing bushing 69, the which it is securely bonded as by the use of a metal-to-metal-cement. The inner end of the pulley sleeve 70 is integrally formed with a belt pulley portion 71, which is mechanically linked with the drive pulley 61 by a V-belt 71a, and which mechanical linkage tension may be adjusted through means of slot 62 in arm 54. The outer end of the pulley sleeve 70, which extends beyond the outer headed end of the bearing shaft 63 with respect to which it is rotatively journalled, is provided with an internally-threaded, reduced diameter bore 72 for the attachment of a rotary cutter blade 73 by means of bolt 74 fitted with a lock washer 75.

As illustrated in FIGS. 1 and 4, the upper end of the intermediate tubular handle 37 terminates in a relatively fixed, sidewardly and somewhat upwardly-extending inner end portion 77 secured to a flattened upper end portion 78 of the intermediate tubular member 37 as by upper and lower bolts 79 and 80, respectively. The upper bolt 79 also has pivotly attached thereto an oppositely outwardly and upwardly-extending left hand handle grip member 81 the inner end of which extends beyond the pivotal attachment bolt 79 to provide an arcuate ratchet portion 82 the arcuate peripheral edge of which, being concentric with the pivotal bolt 79, is provided with a plurality of equidistantly-spaced, arcuate detent recesses 83. An adjustment pawl 84 pivotally secured to an inner end portion of the right hand handle grip member 76 as by a pivot bolt 85 carries a dog pin 86 adapted to be selectively received in one of the arcuate recesses 83 of the left hand handle grip member ratchet portion 82 for adjustably positioning and retaining said left hand handle grip member for the purpose hereinafter appearing. To this end there is provided a torsion spring 87 acting between the pivot bolt 85 and the dog pin 86 and operative to resiliently constrain the adjustment pawl 84 in the clockwise direction as illustrated in FIG. 4, whereat the dog pin 86 will be retained with one of the arcuate recesses 83 as selected. A thumb piece 88, integrally formed with the adjustment pawl 84, is provided for conveniently manually retracting said adjustment pawl when moving pivotally adjustably left hand handle grip member 81 from one rotative or pivotal position to another. A link rod 89 (see FIGS. 1, 4 and 6) has its upper end 90 pivotally connected in an opening at an inner end portion of the left hand handle grip member 81, wherein it is retained as, for example, by an outside C-ring 91, and has its lower end 92 (see FIG. 6) pivotally fitted in a through opening in the rocker arm 54, near the inner end thereof, whereat it is secured in place as by an outside C-ring 93. By means of such linkage, it will be apparent that downward or upward movement of the adjustable left hand handle grip member 81 by control of the adjustment pawl 84 as described above will be accompanied by downward or upward swinging pivotal movement of the rocker arm 54, whereby the cutter height of the trimmer machine can readily be controlled by the operator while in normal operating position without the necessity for him to release his grip on the machine handles. In this connection it is also to be noted that the length and size of the link rod 89 is such that if in use of the machine the cutter blade 73, while in its lowered position, should inadvertently be run into hard material such as rock or concrete, said link rod will resiliently bend to accommodate reactive upward movement of the cutter axis rather than jam the machine or otherwise cause damage such as by destroying the cutter blade.

Referring now to FIGS. 1, 2 and 3 of the drawings it will be seen that the protective cover guard 16 for the cutter blade 73 comprises a sheet metal cover guard assembly 94 in the form of a substantially semi-circular outside protective plate 95 fixed along the upper edge of which is an arcuate top plate portion 96. A front support bracket 97 affixed to the lower front portion of the arcuate top plate portion 96 and secured at its outer end to the threaded stud portion 52 of stud bolt 51 as by nut 98, FIGS. 2, 3 and 6, and a rear support bracket 99, FIGS. 1 and 2, affixed to a lower rear portion of said arcuate top plate portion and affixed at its inner end, as by bolt 100, to the upstanding axle support bracket 40 of the machine platform 11, retain the cutter safety guard assembly 94 in place. The cutter guard assembly 94 further comprises a wire mesh see-through screen portion 101 extending inwardly toward the cutter engine from the underside of the arcuate top plate portion 96 and retained along its outer edge by an arcuate screen support rod 102 to which it is attached and which at each outer end is secured to respective front and rear support brackets 97 and 99. The wire mesh see-through screen portion 101 of the cutter guard assembly 94 provides auxiliary protection against deflected stones and the like missiles being expelled upwardly and outwardly of the machine by the cutting knife while at the same time affording the operator a substantial see-through means and view of the operating cutter blade 73 for purposes of operating and guiding the machine and selecting the desired pivotal position of the rocker arm 54, that is to say, the cutting depth of the cutter blade 73.

The cutter guard assembly 94, for additional protection against injury being caused by objects being projected rearwardly of the machine close to the ground, is provided, along the lower rear edge of the arcuate top plate portion 96 with a hanging hinged type guard plate 103, FIGS. 1 and 2, swingably affixed thereat as by hinged means 105. The lower end of the hanging guard 103 is formed with a short, inwardly-bent tight angle portion 104(FIG. 1)for increased guard protection when swinging and wherein also upward withdrawal of the guard may be made when desired, into the out-of-the-way position, as illustrated by the broken-line representation thereof in FIG. 1. A small permanent magnet 106 affixed against the outside of the rear end of the arcuate top plate portion 96 serves to detachably secure the hanging guard 103 in such out of the way position.

In use of the device the gasoline engine 14 or other prime mover is placed in operation to immediately start rotation of the cutter blade 73 through the medium of pulley 61, the belt 71a and cutter head housing pulley 71. The operator then proceeds to propel the device along a flower border, sidewalk or the line where the grass is to be trimmed and, should the cutter be either too high or too low in elevation as will readily be observable by the operator through the wire mesh see-through screen 101 of the protective cover guard 16, adjustment can readily be made by actuating the pawl thumb piece 88 to permit adjustment of the left hand handle grip member 81 to a position corresponding with the cutter blade height desired, such adjustment being effected through link rod 89 as hereinabove described. It is to be noted that this adjustment is made while the operator maintains a good grip on the handles, thereby minimizing any possibility of losing control of the machine while adjustment is being made, and at the same time obviating any necessity for the operator to make hazardous adjustments of the machine mechanism in the vicinity of the rotating cutter blade. It will also be noted that the compact structure of the machine, coupled with the telescoping rocker arm arrangement for driving the cutter blade, results in a placement of the rotary axis of the cutter blade in closely-spaced parallel relation with respect to that of the inner wheel 12, whereby unusually precise placement and positional control of the cutter blade in its operation is had at all times and whereby cutting or edging along comparatively small radius curves can be effected with continuous forward motion of the cutting machine and without any necessity for back-tracking.

When it is desired to change the mode of operation from conventional vertical type edging service, as illustrated in FIG. 1, to angular or oblique type trimming service position, this is effected simply by the operator pressing down upon the pedal portion 33 of the bell crank lever 26 to release the axle 20 associated with wheel 13 whereupon, as hereinabove described, and assisted by the weight of the machine, the machine platform 11 will assume an inclined position as illustrated in FIG. 3 to similarly incline the cutter blade 73. Here again, conversion is effected by means of a foot pedal and without the necessity for the operator to remove his hands from the handle grips, thereby insuring maximum safety for the operator in his operation and control of the machine. Returning the machine to conventional vertical type edging service position is readily accomplished by manually tilting the machine back again, by use of the gripping handles, until the latch comprising the spring-pressed, downwardly-extending lever arm portion 27 of the bell crank lever 26 falls in place in latching position over the axle 20, as illustrated in FIGS. 2 and 5.

A salient feature of the invention resides in the construction and operation of the cutter drive and positional control mechanism wherein the bearing and cutter head housing rotate in unison upon a fixed shaft, thereby equally distributing the load and wear of operation over the entire bearing wall surface, Long, trouble free service is thus assured as compared with ordinary cutter drive mechanisms wherein the cutter head bearing bushing remains stationary, with the cutter shaft turning, and wherein the load and wear, by the nature of the drive belt course and stress, has a tendency to deform the bushing into egg shape, necessitating early replacement.

It will be apparent from the foregoing that a relatively simple and most effective trimming and edging device has been provided. The mechanism is quickly and easily adjustable either before or during the operation of the cutting mechanism and permits of the adjustment as to the height of the cutting mechanism without danger to the operator, such as is common with devices of this nature. The parts are few and simple, are strong, durable, cheap to manufacture and most effective for the purposes stated.

It is to be understood that the invention is not limited to the precise structural details illustrated, but that changes are contemplated as readily fall within the spirit of the invention as shall be determined by the scope of the subjoined claims.

What I claim as new and desire to secure by Letters Patent is:

1. A lawn edge trimming machine comprising, in combination, a platform member, axle means supporting a pair of wheels, one at one side and the other at the other side of said platform member to provide for rolling said platform member along the ground, handle means extending upwardly and outwardly of the rear of said platform member for manually guiding the platform along the ground, an engine supported on said platform member and having a rotary drive shaft extending transversely outwardly at said one side of said platform member, an elongated rocker arm, means supporting one end of said rocker arm with respect to said platform for pivotal swinging motion in a plane substantially perpendicular to and about an axis coincident with the axis of rotation of said drive shaft, a rotary cutter blade, means journalling said cutter blade with respect to the other end of said rocker arm for rotation in a plane in spaced parallel relation with respect to the pivotal plane of said rocker arm, said cutter blade journalling means comprising a headed bearing shaft bolt fixed with respect to and extending sidewardly outwardly of said rocker arm, a bearing bushing rotably journalled on said bearing shaft bolt and constrained between said rocker arm and the head at the outer end of said bolt, a pulley sleeve circumjacent said bearing bushing and fixed thereto for rotation in unison therewith about said bearing shaft bolt, said pulley sleeve having a pulley at its inner end and extending, at its outer end, beyond the outer end of the head of said bearing shaft bolt, and means for securing said cutter blade at the outer end of said pulley sleeve, said cutter blade securing means being operative to seal said outer end of said pulley sleeve against the entrance of foreign matter to protect the sliding surfaces between said bearing shaft bolt and said bearing bushing, belt means drivingly interconnecting said engine drive shaft with said cutter blade journalling means, abutment means controlled by pivotal movement of said rocker arm for limiting the extent of pivotal movement of said rocker arm with respect to said platform, and and linkage mechanism interconnecting said rocker arm and said platform member for adjustably securing said rocker arm at any one of a plurality of selective pivotal positions within the range of movement permitted by said limiting means.

2. A lawn edge trimming machine as defined in claim 1, wherein said rocker arm supporting means comprises a pivotal support tube coaxially circumjacent said drive shaft and being fixed with respect to said platform member, and a pivotal sleeve telescopingly fitted with respect to said pivotal support tube for mutual rotative motion about a common axis, said one end of said rocker arm being secured to said pivotal sleeve and lying in a plane substantially normal to the common axis of said pivotal sleeve and said pivotal support tube.

3. A lawn edge trimming machine as defined in claim 2, wherein said pivotal sleeve is telescopingly fitted within said pivotal support tube, and wherein said rocker arm pivotal movement limiting means comprises a peripheral slot in said pivotal sleeve and an abutment pin extending through an opening in the side of said pivotal support tube and having an inner end portion received within said peripheral slot.

4. A lawn edge trimming machine as defined in claim 3, including resilient means normally constraining said rocker arm to the uppermost of its limit positions.

5. A lawn edge trimming machine as defined in claim 1, wherein said axle means comprises an elongated axle member, means journalling said other wheel at the outer end of said axle member, means pivotally securing the other end of said axle member with respect to said platform member for pivotal swinging in a vertical plane coincident with the rotational axis of said one wheel, and means for selectively securing said axle member either in a first position whereat its longitudinal axis is substantially coincident with the rotational axis of said one wheel or a second position whereat said longitudinal axis of said axle member defines an obtuse angle with respect to the rotational axis of said one wheel.

6. A lawn edge trimming machine as defined in claim 5, wherein said selective securing means comprises a vertically-extending slot in said platform member at said other side thereof and through which said axle member extends, and foot-operated latch means operative to constrain said axle member to its lowermost position within said vertical slot when said axle member is in said first position.

7. A lawn edge trimming machine as defined in claim 1, including a protective guard fixed with respect to said platform member and enclosing said cutter blade from above, at the outside, at the front and at the back, said protective guard providing sufficient clearance to permit free rotation of said cutter blade throughout its range of pivotal swinging movement, and said protective guard further comprising a wire mesh upper portion permitting see-through observation of the cutter blade by the operator during use of the machine.

8. A lawn edge trimming machine as defined in claim 1, wherein said handle means comprises at its upper end a pair of opposed left-hand and right-hand handle grip members, the inner end of one of said handle grip members being pivotally attached with respect to the other said handle grip members for relative pivotal motion with respect thereto, and wherein said means for adjustably securing said rocker arm comprises a resilient link rod linkingly interconnecting an intermediate portion along said one of said handle grip members with an intermediate portion along said rocker arm.

9. A lawn edge trimming machine as defined in claim 8, wherein said rocker arm adjustable securing means further comprises an arcuate ratchet integrally formed with said one of said handle grip members and a spring-pressed pawl pivotally secured to the other of said handle grip members and having a dog receivable, selectively, in one of a plurality of detent recesses comprising said ratchet.

10. In a lawn edge trimming machine having a platform member, axle means supporting a pair of wheels, one at one side and the other at the other side of said platform member to provide for rolling said platform member along the ground, handle means extending upwardly and outwardly of the rear of said platform member for manually guiding the platform along the ground, an engine supported on said platform member and having a rotary drive shaft extending transversely outwardly at said one side of said platform member, an elongated rock arm, means supporting one end of said rock arm with respect to said platform member for pivotal swinging motion in a plane substantially perpendicular to the axis of rotation of said drive shaft, a rotary cutter blade, means journalling said cutter blade with respect to the other end of said rock arm for rotation in a plane in spaced parallel relation with respect to the pivotal plane of said rock arm, pulley and belt means drivingly interconnecting said engine drive shaft with said cutter blade journalling means, and linkage mechanism interconnecting said other end of said rock arm with respect to said platform member for manual adjustment of said rock arm as to the lowering and raising of said rotary cutter blade in performance of the lawn edge trimming work, that improvement, in combination, wherein said axle means consists of an elongated axle member, means journalling said other wheel at the outer end of said axle member, means pivotally securing the other end of said axle member with respect to said platform member for pivotal swinging in a vertical plane coincident with the rotational axis of said one wheel, and means for selectively securing said axle member either in a first position whereat its longitudinal axis is substantially coincident with the rotational axis of said one wheel or a second position whereat said longitudinal axis of said axle member defines an obtuse angle with respect to the rotational axis of said one wheel.

11. A lawn edge trimming machine as defined in claim 10, wherein said selective securing means comprises a vertically-extending slot in said platform member at said other side thereof and through which said axle member extends, and latch means operative to constrain said axle member to its lower-most position within said vertical slot when said axle member is in said first position.

* * * * *